United States Patent
Moroguchi et al.

(10) Patent No.: US 11,161,790 B2
(45) Date of Patent: Nov. 2, 2021

(54) CUBIC BORON NITRIDE SINTERED MATERIAL

(71) Applicants: SUMITOMO ELECTRIC HARDMETAL CORP., Itami (JP); Sumitomo Electric Industries, Ltd., Osaka (JP)

(72) Inventors: Hironari Moroguchi, Itami (JP); Michiko Matsukawa, Itami (JP); Satoru Kukino, Itami (JP); Akito Ishii, Osaka (JP); Katsumi Okamura, Osaka (JP); Machiko Abe, Itami (JP); Kenta Sano, Itami (JP)

(73) Assignees: SUMITOMO ELECTRIC HARDMETAL CORP., Itami (JP); Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 17/254,380

(22) PCT Filed: Dec. 16, 2019

(86) PCT No.: PCT/JP2019/049195
§ 371 (c)(1),
(2) Date: Dec. 21, 2020

(87) PCT Pub. No.: WO2021/124403
PCT Pub. Date: Jun. 24, 2021

(65) Prior Publication Data
US 2021/0246077 A1 Aug. 12, 2021

(51) Int. Cl.
*C04B 35/5831* (2006.01)
*B23B 27/14* (2006.01)

(52) U.S. Cl.
CPC ........ *C04B 35/5831* (2013.01); *B23B 27/148* (2013.01); *B23B 2226/125* (2013.01); *C04B 2235/3217* (2013.01); *C04B 2235/3418* (2013.01); *C04B 2235/386* (2013.01); *C04B 2235/3813* (2013.01); *C04B 2235/3856* (2013.01); *C04B 2235/3865* (2013.01); *C04B 2235/3873* (2013.01); *C04B 2235/3886* (2013.01); *C04B 2235/404* (2013.01); *C04B 2235/405* (2013.01); *C04B 2235/77* (2013.01); *C04B 2235/96* (2013.01)

(58) Field of Classification Search
CPC .......... B23B 27/148; C04B 2235/3813; C04B 2235/386; C04B 35/5831
See application file for complete search history.

(56) References Cited

U.S. PATENT DOCUMENTS

| | | |
|---|---|---|
| 6,316,094 B1 | 11/2001 | Fukaya et al. |
| 2005/0143252 A1 | 6/2005 | Okamura et al. |
| 2006/0213127 A1 | 9/2006 | Saka et al. |
| 2008/0254282 A1 | 10/2008 | Kukino et al. |
| 2015/0328691 A1 | 11/2015 | Okamura et al. |
| 2017/0014915 A1* | 1/2017 | Watanobe ............ C04B 41/52 |
| 2017/0369314 A1 | 12/2017 | Zhang et al. |
| 2019/0071360 A1 | 3/2019 | Shin et al. |

FOREIGN PATENT DOCUMENTS

| | | |
|---|---|---|
| CN | 109534826 A | 3/2019 |
| JP | 2000-044350 A | 2/2000 |
| JP | 2005-187260 A | 7/2005 |
| JP | 2006-347850 A | 12/2006 |
| JP | 2018-505839 A | 3/2018 |
| JP | 2019-515864 A | 6/2019 |
| WO | WO-2004/103615 A1 | 12/2004 |
| WO | WO-2007/039955 A1 | 4/2007 |
| WO | WO-2007/145071 A1 | 12/2007 |

OTHER PUBLICATIONS

Bezhenar. Physico Mechanical Properties of cBN Composites Produced by a High Pressure Reaction Sintering of Cubic Boron Nitride and Aluminum Powders. Journal of Superhard Materials, 2010, vol. 32, No. 1, pp. 1-13. © Allerton Press, Inc., 2010. (Year: 2010).*
Notice of Reasons of Rejection with English Language Translation dated Mar. 16, 2021, issued in Japanese patent application No. 2020-540511.
Shinichi Shikata et al., "Evaluation of Defect of Low-Resistance Diamond for Power Devices", Kyushu Synchrotron Light Research Center, (2018), vol. 2016, pp. 14-16.
N. V. Novikov et al., "Studies on the Plastic Deformation of CBN", Sverkhtverdye Materialy, May 14, 1985, vol. 7, No. 2, pp. 17-20 (with attached English-language translation).

* cited by examiner

*Primary Examiner* — Matthew E. Hoban
(74) *Attorney, Agent, or Firm* — Faegre Drinker Biddle & Reath LLP

(57) ABSTRACT

A cubic boron nitride sintered material comprises 30% by volume or more and 80% by volume or less of cubic boron nitride grains and 20% by volume or more and 70% by volume or less of a binder phase, the cubic boron nitride grains having a dislocation density of $3\times10^{17}/m^2$ or more and $1\times10^{20}/m^2$ or less.

8 Claims, No Drawings the periodic table, aluminum, silicon, cobalt and nickel and at least one element selected from the group consisting of nitrogen, carbon, boron and oxygen, and a solid solution derived from the compound, the cubic boron nitride grains having a dislocation density of $3 \times 10^{17}/m^2$ or more and $1 \times 10^{20}/m^2$ or less.

CUBIC BORON NITRIDE SINTERED MATERIAL

TECHNICAL FIELD

The present disclosure relates to a cubic boron nitride sintered material.

BACKGROUND ART

A cubic boron nitride sintered material (Hereinafter also referred to as a "cBN sintered material") is known as a high hardness material used in a cutting tool or the like. The cBN sintered material is typically composed of cubic boron nitride grains (hereinafter also referred to as "cBN grains") and a binder phase, and its characteristics tend to vary depending on the content of the cBN grains.

Accordingly, in the field of cutting, the type of cBN sintered material to be applied to a cutting tool is selected depending on the material of a workpiece, the required processing accuracy, and the like. For example, a cBN sintered material having a low content of cubic boron nitride (hereinafter also referred to as "cBN") can be suitably used for cutting of hardened steel or the like.

Japanese Patent Laid-Open No. 2000-044350 (PTL 1) discloses, as a tool made of a cBN sintered material optimized in crater resistance and strength and excellent in fracture resistance, a cutting tool comprising a cBN sintered material including 45 to 70% by volume of cBN grains and having the cBN grains sintered with a binder phase.

CITATION LIST

Patent Literature

PTL 1: Japanese Patent Laying-open No. 2000-044350

SUMMARY OF INVENTION

The presently disclosed cubic boron nitride sintered material comprises 30% by volume or more and 80% by volume or less of cubic boron nitride grains and 20% by volume or more and 70% by volume or less of a binder phase, the binder phase including:
at least one selected from the group consisting of: a simple substance selected from the group consisting of a group 4 element, a group 5 element and a group 6 element of the periodic table, aluminum, silicon, cobalt and nickel; an alloy thereof; and an intermetallic compound thereof;
at least one selected from the group consisting of: a compound consisting of at least one element selected from the group consisting of a group 4 element, a group 5 element and a group 6 element of the periodic table, aluminum, silicon, cobalt and nickel, and at least one element selected from the group consisting of nitrogen, carbon, boron and oxygen; and a solid solution derived from the compound; or
at least one selected from the group consisting of a simple substance selected from the group consisting of a group 4 element, a group 5 element and a group 6 element of the periodic table, aluminum, silicon, cobalt and nickel, an alloy thereof, and an intermetallic compound thereof; and at least one selected from the group consisting of a compound consisting of at least one element selected from the group consisting of a group 4 element, a group 5 element and a group 6 element of the periodic table, aluminum, silicon, cobalt and nickel and at least one element selected from the group consisting of nitrogen, carbon, boron and oxygen, and a solid solution derived from the compound, the cubic boron nitride grains having a dislocation density of $3 \times 10^{17}/m^2$ or more and $1 \times 10^{20}/m^2$ or less.

DETAILED DESCRIPTION

Problems to be Solved by the Present Disclosure

In recent years, in view of cost reduction, there is a demand for a cubic boron nitride sintered material allowing a tool to have a long life when the tool is used for intermittently processing hardened steel.

Accordingly, an object of the present invention is to provide a cubic boron nitride sintered material that, when used as a material for a tool, allows the tool to have a long life even when it is used for intermittently processing hardened steel.

Advantageous Effect of the Present Disclosure

When the presently disclosed cubic boron nitride sintered material is used as a material for a tool, the cubic boron nitride sintered material allows the tool to have a long life even when it is used for intermittently processing hardened steel.

Overview of Embodiments of the Present Disclosure

Initially, embodiments of the present disclosure will be listed and specifically described.

(1) The presently disclosed cubic boron nitride sintered material comprises 30% by volume or more and 80% by volume or less of cubic boron nitride grains and 20% by volume or more and 70% by volume or less of a binder phase, the binder phase including
at least one selected from the group consisting of: a simple substance selected from the group consisting of a group 4 element, a group 5 element and a group 6 element of the periodic table, aluminum, silicon, cobalt and nickel; an alloy thereof; and an intermetallic compound thereof;
at least one selected from the group consisting of: a compound consisting of at least one element selected from the group consisting of a group 4 element, a group 5 element and a group 6 element of the periodic table, aluminum, silicon, cobalt and nickel, and at least one element selected from the group consisting of nitrogen, carbon, boron and oxygen; and a solid solution derived from the compound; or
at least one selected from the group consisting of a simple substance selected from the group consisting of a group 4 element, a group 5 element and a group 6 element of the periodic table, aluminum, silicon, cobalt and nickel, an alloy thereof, and an intermetallic compound thereof; and at least one selected from the group consisting of a compound consisting of at least one element selected from the group consisting of a group 4 element, a group 5 element and a group 6 element of the periodic table, aluminum, silicon, cobalt and nickel and at least one element selected from the group consisting of nitrogen, carbon, boron and oxygen, and a solid solution derived from the compound, the cubic boron nitride grains having a dislocation density of $3\times10^{17}/m^2$ or more and $1\times10^{20}/m^2$ or less.

When the presently disclosed cubic boron nitride sintered material is used as a material for a tool, the cubic boron nitride sintered material allows the tool to have a long life even when it is used for high-speed processing of hardened steel.

(2) The cubic boron nitride grains preferably have a dislocation density of $5\times10^{17}/m^2$ or more and $9.5\times10^{19}/m^2$ or less. This provides a further increased tool life.

(3) The cubic boron nitride grains preferably include 0.02% by mass or more and 0.2% by mass or less of calcium. This provides a further increased tool life.

(4) The cubic boron nitride grains preferably include 0.02% by mass or more and 0.17% by mass or less of calcium. This provides a further increased tool life.

(5) The cubic boron nitride grains preferably include 0.02% by mass or more and 0.15% by mass or less of calcium. This provides a further increased tool life.

(6) The cubic boron nitride sintered material preferably comprises 40% by volume or more and 75% by volume or less of the cubic boron nitride grains. This provides a further increased tool life.

DETAILED DESCRIPTION OF EMBODIMENTS

Initially the present inventors have observed why a tool using a conventional cubic boron nitride sintered material has a reduced tool life when it is used in intermittently processing hardened steel. As a result, the present inventors have found that the cubic boron nitride sintered material has insufficient strength, and when the tool is used for intermittently processing hardened steel, in particular, insufficient strength invites cracking, resulting in a reduced tool life.

The present inventors have conducted more detailed studies on factors affecting the strength of the cubic boron nitride sintered material. As a result, the present inventors have found that cubic boron nitride grains' dislocation density affects the strength of the cubic boron nitride sintered material. Cubic boron nitride includes significantly many dislocations, and those skilled in the art have conventionally not paid attention to a relationship between cubic boron nitride grains' dislocation density and tool life.

As a result of intensive studies based on the above findings, the present inventors have completed the presently disclosed cubic boron nitride sintered material.

Hereinafter, a specific example of the presently disclosed cubic boron nitride sintered material will be described. In the present specification, an expression in the form of "A-B" means a range's upper and lower limits (that is, A or more and B or less), and when A is not accompanied by any unit and B is alone accompanied by a unit, A has the same unit as B.

In the present specification, when a compound or the like is represented by a chemical formula without specifying any specific atomic ratio, it shall include any conventionally known atomic ratio and should not necessarily be limited to what falls within a stoichiometric range. For example, for "TiN," the ratio of the number of atoms constituting TiN includes any conventionally known atomic ratio.

«Cubic boron nitride sintered material»

A cubic boron nitride sintered material according to one embodiment of the present disclosure is a cubic boron nitride sintered material comprising 30% by volume or more and 80% by volume or less of cubic boron nitride grains and 20% by volume or more and 70% by volume or less of a binder phase, the binder phase including:

at least one selected from the group consisting of: a simple substance selected from the group consisting of a group 4 element, a group 5 element and a group 6 element of the periodic table, aluminum, silicon, cobalt and nickel; an alloy thereof; and an intermetallic compound thereof;

at least one selected from the group consisting of: a compound consisting of at least one element selected from the group consisting of a group 4 element, a group 5 element and a group 6 element of the periodic table, aluminum, silicon, cobalt and nickel, and at least one element selected from the group consisting of nitrogen, carbon, boron and oxygen; and a solid solution derived from the compound; or at least one selected from the group consisting of a simple substance selected from the group consisting of a group 4 element, a group 5 element and a group 6 element of the periodic table, aluminum, silicon, cobalt and nickel, an alloy thereof, and an intermetallic compound thereof; and at least one selected from the group consisting of a compound consisting of at least one element selected from the group consisting of a group 4 element, a group 5 element and a group 6 element of the periodic table, aluminum, silicon, cobalt and nickel and at least one element selected from the group consisting of nitrogen, carbon, boron and oxygen, and a solid solution derived from the compound, the cubic boron nitride grains having a dislocation density of $3\times10^{17}/m^2$ or more and $1\times10^{20}/m^2$ or less.

When the presently disclosed cubic boron nitride sintered material is used as a material for a tool, the cubic boron nitride sintered material allows the tool to have a long life even when it is used for high-speed processing of hardened steel, in particular. A reason for this is inferred as indicated by items (i) to (iii) below:

(i) The presently disclosed cubic boron nitride sintered material comprises 30% by volume or more and 80% by volume or less of cBN grains high in hardness, strength and toughness. For this reason, it is inferred that the cubic boron nitride sintered material has excellent wear resistance and excellent fracture resistance, and hence allows an extended tool life.

(ii) In the presently disclosed cubic boron nitride sintered material, the binder phase includes:

at least one selected from the group consisting of: a simple substance selected from the group consisting of a group 4 element, a group 5 element and a group 6 element of the periodic table, aluminum, silicon, cobalt and nickel; an alloy thereof; and an intermetallic compound thereof;

at least one selected from the group consisting of: a compound consisting of at least one element selected from the group consisting of a group 4 element, a group 5 element and a group 6 element of the periodic table, aluminum, silicon, cobalt and nickel, and at least one element selected from the group consisting of nitrogen, carbon, boron and oxygen; and a solid solution derived from the compound; or at least one selected from the group consisting of a simple substance selected from the group consisting of a group 4 element, a group 5 element and a group 6 element of the periodic table, aluminum, silicon, cobalt and nickel, an alloy thereof, and an intermetallic compound thereof; and at least one selected from the group consisting of a compound consisting of at least one element selected from the group consisting of a group 4 element, a group 5 element and a group 6 element of the periodic table, aluminum, silicon, cobalt and nickel and at least one element selected from the group consisting of nitrogen, carbon, boron and oxygen, and a solid solution derived from the compound.

The binder phase has a large force to bind to cBN grains. For this reason, it is inferred that the cubic boron nitride sintered material has excellent fracture resistance and hence allows an extended tool life.

(iii) The presently disclosed cubic boron nitride sintered material comprises cubic boron nitride grains having a dislocation density of $3 \times 10^{17}/m^2$ or more and $1 \times 10^{20}/m^2$ or less. The cubic boron nitride grains are enhanced in thermal conductivity. Accordingly, the cubic boron nitride sintered material including the cubic boron nitride grains is also enhanced in thermal conductivity. Therefore, even when a tool using the cubic boron nitride sintered material is used for high-speed processing of hardened steel, the temperature of and in a vicinity of a point of the tool in contact with the workpiece is not easily increased, which suppresses crater wear and it is thus inferred that an extended tool life is provided.

While the above describes that the tool using the presently disclosed cubic boron nitride sintered material has a long tool life in high-speed processing of hardened steel, the workpiece is not limited thereto. Examples of the workpiece include carburized and quenched steel (SCM415H, SCr420H), induction-hardened steel (S45C), and bearing steel (SUJ2).

(Composition of Cubic Boron Nitride Sintered Material)

The presently disclosed cubic boron nitride sintered material comprises 30% by volume or more and 80% by volume or less of cubic boron nitride grains and 20% by volume or more and 70% by volume or less of a binder phase. Note that the cBN sintered material may include inevitable impurities resulting from raw materials, manufacturing conditions, and the like.

The cBN sintered material preferably contains cBN grains at a ratio with a lower limit of 30% by volume, preferably 35% by volume, more preferably 40% by volume. The cBN sintered material contains cBN grains at the ratio with an upper limit of 80% by volume, preferably 77% by volume, more preferably 75% by volume. The cBN sintered material contains cBN grains at a ratio of 30% by volume or more and 80% by volume or less, preferably 35% by volume or more and 77% by volume or less, more preferably 40% by volume or more and 75% by volume or less.

The cBN sintered material contains a binder phase at a ratio with a lower limit of 20% by volume, preferably 23% by volume, more preferably 25% by volume. The cBN sintered material contains the binder phase at the ratio with an upper limit of 70% by volume, preferably 65% by volume, more preferably 60% by volume. The cBN sintered material contains the binder phase at a ratio of 20% by volume or more and 70% by volume or less, preferably 23% by volume or more and 65% by volume or less, more preferably 25% by volume or more and 60% by volume or less.

The cBN sintered material's cBN grain content ratio (vol %) and binder phase content ratio (vol %) can be confirmed by subjecting the cBN sintered material to structural observation, elemental analysis, and the like by using an energy dispersive X-ray analyzer (EDX) (Octan Elect EDS system) accompanying a scanning electron microscope (SEM) ("JSM-7800F" (trade name) manufactured by JEOL Ltd.) (hereinafter also referred to as an "SEM-EDX"). The content ratios are specifically measured in the following method.

Initially, the cBN sintered material is cut at a desired part to prepare a sample including a cross section of the cBN sintered material. The cross section can be prepared using a focused ion beam device, a cross section polisher, or the like. Subsequently, the cross section is observed with an SEM with a magnification of 5,000 times to obtain a backscattered electron image. In the backscattered electron image, a region where cBN grains are present will be a black region and a region where the binder phase is present will be a gray region or a white region.

Subsequently, the backscattered electron image is binarized using image analysis software ("WinROOF" by Mitani Corporation). From the binarized image, an area ratio of pixels that are attributed to a dark field (i.e., pixels attributed to cBN grains) in the area of the field of view for measurement is calculated. The calculated area ratio can be regarded as a value in % by volume, and a cBN grain content ratio (vol %) can thus be obtained.

From the binarized image, an area ratio of pixels that are attributed to a bright field (i.e., pixels attributed to the binder phase) in the area of the field of view for measurement can be calculated to obtain a binder phase content ratio (vol %).

As measured by the applicant, it has been confirmed that, for measurement of the cBN sintered material's cBN grain content ratio (vol %) and binder phase content ratio (vol %) in the same sample, while a location where a field of view for measurement is selected is changed and calculation is thus performed for a plurality of times, measurement results are obtained without substantial variation and thus there is no arbitrariness even with a field of view set, as desired, for measurement.

The fact that the pixels attributed to the dark field are attributed to cBN grains can be confirmed by subjecting the cBN sintered material to elemental analysis with SEM-EDX.

(Inevitable Impurities)

The presently disclosed cubic boron nitride sintered material may include inevitable impurities within a range showing the effect of the present disclosure. Examples of the inevitable impurities include hydrogen, oxygen, carbon, alkali metal elements (lithium (Li), sodium (Na), potassium (K), and the like), alkaline earth metal elements (calcium (Ca), magnesium (Mg), and the like), and other similar metal elements. When the cubic boron nitride sintered material includes inevitable impurities, the inevitable impurities are preferably contained in an amount of 0.1% by mass or less. The content of the inevitable impurities can be measured through secondary ion mass spectrometry (SIMS).

«Cubic Boron Nitride Grains»

(Dislocation Density)

The cubic boron nitride grains included in the cubic boron nitride sintered material of the present disclosure have a dislocation density of $3 \times 10^{17}/m^2$ or more and $1 \times 10^{20}/m^2$ or less. The cubic boron nitride grains have dislocations in contact with one another three-dimensionally and it is thus inferred that strength is enhanced omni-directionally and fracture resistance is enhanced. Furthermore, the cubic boron nitride grain having a dislocation density of $1 \times 10^{20}/m^2$ or less is resistant to fracture derived from defect therein and thus allows a tool composed thereof to have an extended tool life.

The cubic boron nitride grains have a dislocation density with a lower limit of $3 \times 10^{17}/m^2$ or more, preferably $5 \times 10^{17}/m^2$ or more, more preferably $8 \times 10^{17}/m^2$ or more. The cubic boron nitride grains have a dislocation density with an upper limit of $1 \times 10^{20}/m^2$ or less, preferably $9.5 \times 10^{19}/m^2$ or less, more preferably $9 \times 10^{19}/m^2$ or less. The cubic boron nitride grains have a dislocation density of $3\times10^{17}/m^2$ or more and $1\times10^{20}/m^2$ or less, preferably $5\times10^{17}/m^2$ or more and $9.5\times10^{19}/m^2$ or less, more preferably $8\times10^{17}/m^2$ or more and $9\times10^{19}/m^2$ or less.

As described herein, the cubic boron nitride grains' dislocation density is measured in a large-scale synchrotron radiation facility (e.g., SPring-8 (located in Hyogo Prefecture)). Specifically, it is measured in the following method.

Initially, a sample of the cubic boron nitride sintered material is introduced into a container and sealed therein, and in the container the sample is immersed in fluoronitric acid (hydrofluoric acid:nitric acid=5:5, which is a ratio in volume) for 48 hours. As a result, the binder phase completely dissolves in the fluoronitric acid, and the cBN grains remain alone. The cBN grains are introduced into a 0.3 mm φ capillary manufactured by TOHO for X-ray crystallography ("Mark Tube" (trademark) manufactured by TOHO) and thus prepared as a sealed-off specimen.

The specimen was subjected to X-ray diffraction measurement under the following conditions, and a line profile of a diffraction peak from each orientation plane of cubic boron nitride's major orientations which are (111), (200), (220), (311), (400) and (531) is obtained.

(Conditions for X-Ray Diffraction Measurement)
X-ray source: synchrotron radiation
Condition for equipment: detector MYTHEN
Energy: 18 keV (wavelength: 0.6888 angstrom)
Camera length: 573 mm
Measurement peak: six peaks from cubic boron nitride's (111), (200), (220), (311), (400), and (531). When it is difficult to obtain a profile depending on texture and orientation, the peak for that Miller index is excluded.

Measuring condition: there are 9 or more measurement points set in the full width at half maximum corresponding to each measurement peak. Peak top intensity is set to 2000 counts or more. Peak tail is also used in the analysis, and accordingly, the measurement range is set to about 10 times the full width at half maximum.

A line profile obtained from the above X-ray diffraction measurement will be a profile including both a true broadening attributed to a physical quantity such as the sample's inhomogeneous strain and a broadening attributed to the equipment. In order to determine inhomogeneous strain and crystallite size, a component attributed to the equipment is removed from the measured line profile to obtain a true line profile. The true line profile is obtained by fitting the obtained line profile and the line profile that is attributed to the equipment by a pseudo Voigt function, and subtracting the line profile attributed to the equipment. $LaB_6$ was used as a standard sample for removing a broadening of a diffracted wave attributed to the equipment. When significantly collimated radiation is used, a broadening of a diffracted wave attributed to the equipment may be regarded as zero.

The obtained true line profile is analyzed using the modified Williamson-Hall method and the modified Warren-Averbach method to calculate dislocation density. The modified Williamson-Hall method and the modified Warren-Averbach method are known line profile analysis methods used for determining dislocation density.

The modified Williamson-Hall method's expression is represented by the following expression (I):

$$\Delta K = \frac{0.9}{D} + \left(\frac{\pi M^2 b^2}{2}\right)^{1/2} \rho^{1/2} K C^{1/2} + O(K^2 C) \quad (I)$$

where $\Delta K$ represents a half width of a line profile, D represents a crystallite size, M represents an arrangement parameter, b represents a Burgers vector, ρ represents dislocation density, K represents a scattering vector, O ($K^2C$) represents a higher-order term of $K^2C$, and C represents an average contrast factor.

C in the above expression (I) is represented by the following expression (II):

$$C=C_{h00}[1-q(h^2k^2+h^2l^2+k^2l^2)/(h^2+k^2+l^2)^2] \quad (II).$$

In the above expression (II), a contrast factor Choo for screw dislocation and that for edge dislocation and a coefficient q for each contrast factor are obtained by using the computing code ANIZC, with a slip system of <110>{III}, and elastic stiffness $C_{11}$, $C_{12}$ and $C_{44}$ of 8.44 GPa, 1.9 GPa, and 4.83 GPa, respectively. Contrast factor $C_{h00}$ is 0.203 for screw dislocation and 0.212 for edge dislocation. The coefficient q for the contrast factor is 1.65 for screw dislocation and 0.58 for edge dislocation. Note that screw dislocation's ratio is fixed to 0.5 and edge dislocation's ratio is fixed to 0.5.

Furthermore, between dislocation and inhomogeneous strain, a relationship represented by an expression (III) is established using contrast factor C, as below:

$$<\varepsilon(L)^2>=(\rho C b^2/4\pi)\ln(R_e/L) \quad (III),$$

where $R_e$ represents dislocation's effective radius.

By the relationship of the above expression (III) and the Warren-Averbach expression, the following expression (IV) can be presented, and as the modified Warren-Averbach method, dislocation density p and a crystallite size can be determined.

$$\ln A(L)=\ln A^S(L)-(\pi L^2 \rho b^2/2)\ln(R_e/L)(K^2C)+O(K^2C)^2 \quad (IV),$$

where A(L) represents a Fourier series, $A^S(L)$ represents a Fourier series for a crystallite size, and L represents a Fourier length.

For details of the modified Williamson-Hall method and the modified Warren-Averbach method, see T. Ungar and A. Borbely, "The effect of dislocation contrast on x-ray line broadening: A new approach to line profile analysis," Appl. Phys. Lett., vol. 69, no. 21, p. 3173, 1996, and T. Ungar, S. Ott, P. Sanders, A. Borbely, J. Weertman, "Dislocations, grain size and planar faults in nanostructured copper determined by high resolution X-ray diffraction and a new procedure of peak profile analysis," Acta Mater., vol. 46, no. 10, pp. 3693-3699, 1998.

As measured by the applicant, it has been confirmed that, for measurement of the cBN grains' dislocation density in the same sample, while a location where a measurement range is selected is changed and calculation is thus performed for a plurality of times, measurement results are obtained without substantial variation and there is no arbitrariness even with a field of view set, as desired, for measurement.

(Calcium Content)

The cubic boron nitride grains included in the presently disclosed cubic boron nitride sintered material preferably include 0.2% by mass or less of calcium. When the cBN grains include calcium, the cBN grains have reduced atomic vacancies and hence per se have increased strength and toughness at room temperature and high temperature, and a tool using the cubic boron nitride sintered material has a further extended tool life.

The cubic boron nitride grains have a calcium content with an upper limit preferably of 0.2% by mass, more preferably 0.17% by mass, still more preferably 0.15% by mass. While the cubic boron nitride grains have the calcium content without any particular lower limit, it is preferably 0.02% by mass from a viewpoint of production. The cubic boron nitride grains have a calcium content preferably of 0.02% by mass or more and 0.2% by mass or less, more preferably 0.02% by mass or more and 0.17% by mass or less, still more preferably 0.02% by mass or more and 0.15% by mass or less.

The calcium content of the cubic boron nitride grains is measured in the following method:

A sample of the cubic boron nitride sintered material is introduced into a container and sealed therein, and in the container the sample is immersed in fluoronitric acid (hydrofluoric acid:nitric acid=5:5, which is a ratio in volume) for 48 hours. As a result, the binder phase completely dissolves in the fluoronitric acid, and the cBN grains remain alone. The cBN grains are subjected to high-frequency inductively coupled plasma-atomic emission spectroscopy (ICP) (with a measurement apparatus: ThermoFisher iCAP6500) to quantitatively measure the calcium content of the cBN grains.

(Median Diameter d50)

A median diameter d50 in equivalent circular diameter of the cubic boron nitride grains included in the cubic boron nitride sintered material of the present disclosure (hereinafter also simply referred to as "median diameter d50") is preferably 1 nm or more and 10,000 nm or less, more preferably 10 nm or more and 8,000 nm or less. This allows a tool using the cubic boron nitride sintered material to have a long tool life.

In the present specification, a median diameter d50 in equivalent circular diameter of cubic boron nitride grains is determined as follows: at each of selected five measurement points as desired, a median diameter d50 of a plurality of cubic boron nitride grains is measured and an average of such median diameters d50 obtained at the five measurement points is calculated to obtain the median diameter d50 in equivalent circular diameter of the cubic boron nitride grains. A specific measurement method is as follows.

When the cubic boron nitride sintered material is used as a part of a tool, the portion of the cubic boron nitride sintered material is cut out by a diamond grindstone electrodeposition wire or the like, the cross section cut out is polished, and five measurement points are set on the polished surface as desired.

The polished surface is observed at each measurement point with a SEM ("JSM-7500F" (trade name) manufactured by JEOL Ltd.) to obtain a SEM image. The measurement is done in a field of view having a size of 12 μm×15 μm, and the observation is done at a magnification of 10,000 times.

The distribution in equivalent circular diameter of cubic boron nitride grains is calculated for each of the five SEM images using image processing software (Win Roof ver. 7.4.5) in a state where the cubic boron nitride grains observed within a field of view for measurement are separated from each other at a grain boundary.

From the distribution in equivalent circular diameter of cubic boron nitride grains, a median diameter d50 for each measurement point is calculated, and an average of the median diameters d50 obtained at the measurement points is calculated. The average value corresponds to the median diameter d50 in equivalent circular diameter of the cubic boron nitride grains.

Note that, as measured by the applicant, it has been confirmed that, for measurement of median diameter d50 of cubic boron nitride grains in the same sample, while a location in the cubic boron nitride sintered material where a field of view for measurement is selected is changed and calculation is thus performed for a plurality of times, measurement results are obtained without substantial variation and there is no arbitrariness even with a field of view set, as desired, for measurement.

«Binder Phase»

The binder phase plays a role in making cBN particles, which are a difficult-to-sinter material, sinterable at industrial-level pressure and temperature. The binder phase has a lower reactivity with iron than cBN, and thus additionally acts to suppress chemical wear and thermal wear in cutting of high hardness hardened steel. In addition, when a cBN sintered material contains the binder phase, it enhances wear resistance in high-efficiency processing of high hardness hardened steel.

The presently disclosed cBN sintered material comprises a binder phase that includes:

at least one selected from the group consisting of a simple substance selected from the group consisting of a group 4 element, a group 5 element and a group 6 element of the periodic table, aluminum, silicon, cobalt and nickel (hereinafter also referred to as "the group A"), an alloy thereof, and an intermetallic compound thereof;

at least one selected from the group consisting of: a compound consisting of at least one element selected from the group consisting of a group 4 element, a group 5 element and a group 6 element of the periodic table, aluminum, silicon, cobalt and nickel (or the group A) and at least one element selected from the group consisting of nitrogen, carbon, boron and oxygen (hereinafter also referred to as "the group B"); and a solid solution derived from the compound; or at least one selected from the group consisting of a simple substance selected from the group consisting of a group 4 element, a group 5 element and a group 6 element of the periodic table, aluminum, silicon, cobalt and nickel (or the group A), an alloy thereof, and an intermetallic compound thereof; and at least one selected from the group consisting of a compound consisting of at least one element selected from the group consisting of a group 4 element, a group 5 element and a group 6 element of the periodic table, aluminum, silicon, cobalt and nickel (or the group A) and at least one element selected from the group consisting of nitrogen, carbon, boron and oxygen (or the group B), and a solid solution derived from the compound. That is, the binder phase can be in any of the following forms (a) to (f):

(a) The binder phase consists of at least one of a simple substance, an alloy, and an intermetallic compound of the group A.

(b) The binder phase includes at least one of a simple substance, an alloy, and an intermetallic compound of the group A.

(c) The binder phase consists of at least one selected from the group consisting of a compound consisting of at least one element selected from the group A and at least one element selected from the group B, and a solid solution derived from the compound.

(d) The binder phase includes at least one selected from the group consisting of a compound consisting of at least one element selected from the group A and at least one element selected from the group B, and a solid solution derived from the compound.

(e) The binder phase consists of at least one selected from the group consisting of at least one of a simple substance, an alloy, and an intermetallic compound of the group A, and a compound consisting of at least one element selected from the group A and at least one element selected from the group B and a solid solution derived from the compound.

(f) The binder phase includes at least one selected from the group consisting of at least one of a simple substance, an alloy, and an intermetallic compound of the group A, and a compound consisting of at least one element selected from the group A and at least one element selected from the group B and a solid solution derived from the compound.

The group 4 element of the periodic table includes titanium (Ti), zirconium (Zr) and hafnium (Hf) for example. The group 5 element of the periodic table includes vanadium (V), niobium (Nb) and tantalum (Ta) for example. The group 6 element of the periodic table includes chromium (Cr), molybdenum (Mo) and tungsten (W) for example. Hereinafter, the group 4 element, the group 5 element, the group 6 element, aluminum, silicon, cobalt and nickel will also be referred to as a "first metal element."

Examples of the alloy of the first metal element include Ti—Zr, Ti—Hf, Ti—V, Ti—Nb, Ti—Ta, Ti—Cr, and Ti—Mo. Examples of the intermetallic compound of the first metal element include $TiCr_2$, $Ti_3Al$ and Co—Al.

Examples of the compound including the first metal element and nitrogen (i.e., a nitride) include titanium nitride (TiN), zirconium nitride (ZrN), hafnium nitride (HfN), vanadium nitride (VN), niobium nitride (NbN), tantalum nitride (TaN), chromium nitride ($Cr_2N$), molybdenum nitride (MoN), tungsten nitride (WN), aluminum nitride (AlN), silicon nitride ($Si_3N_4$), cobalt nitride (CoN), nickel nitride (NiN), titanium zirconium nitride (TiZrN), titanium hafnium nitride (TiHfN), titanium vanadium nitride (TiVN), titanium niobium nitride (TiNbN), titanium tantalum nitride (TiTaN), titanium chromium nitride (TiCrN), titanium molybdenum nitride (TiMoN), titanium tungsten nitride (TiWN), titanium aluminum nitride (TiAlN, $Ti_2AlN$, $Ti_3AlN$), zirconium hafnium nitride (ZrHfN), zirconium vanadium nitride (ZrVN), zirconium niobium nitride (ZrNbN), zirconium tantalum nitride (ZrTaN), zirconium chromium nitride (ZrCrN), zirconium molybdenum nitride (ZrMoN), zirconium tungsten nitride (ZrWN), hafnium vanadium nitride (HfVN), hafnium niobium nitride (HfNbN), hafnium tantalum nitride (HfTaN), hafnium chromium nitride (HfCrN), hafnium molybdenum nitride (HfMoN), hafnium tungsten nitride (HfWN), vanadium niobium nitride (VNbN), vanadium tantalum nitride (VTaN), vanadium chromium nitride (VCrN), vanadium molybdenum nitride (VMoN), vanadium tungsten nitride (VWN), niobium tantalum nitride (NbTaN), niobium chromium nitride (NbCrN), niobium molybdenum nitride (NbMoN), niobium tungsten nitride (NbWN), tantalum chromium nitride (TaCrN), tantalum molybdenum nitride (TaMoN), tantalum tungsten nitride (TaWN), chromium molybdenum nitride (CrMoN), chromium tungsten nitride (CrWN), and molybdenum chromium nitride (MoWN).

Examples of the compound including the first metal element and carbon (i.e., a carbide) include titanium carbide (TiC), zirconium carbide (ZrC), hafnium carbide (HfC), vanadium carbide (VC), niobium carbide (NbC), tantalum carbide (TaC), chromium carbide ($Cr_3C_2$), molybdenum carbide (MoC), tungsten carbide (WC), silicon carbide (SiC), and tungsten-cobalt carbide ($W_2CO_3C$).

Examples of the compound including the first metal element and boron (i.e., a boride) include titanium boride ($TiB_2$), zirconium boride ($ZrB_2$), hafnium boride ($HfB_2$), vanadium boride ($VB_2$), niobium boride ($NbB_2$), tantalum boride ($TaB_2$), chromium boride (CrB), molybdenum boride (MoB), tungsten boride (WB), aluminum boride ($AlB_2$), cobalt boride ($Co_2B$), and nickel boride ($Ni_2B$).

Examples of the compound including the first metal element and oxygen (i.e., an oxide) include titanium oxide ($TiO_2$), zirconium oxide ($ZrO_2$), hafnium oxide ($HfD_2$), vanadium oxide ($V_2O_5$), niobium oxide ($Nb_2O_5$), tantalum oxide ($Ta_2O_5$), chromium oxide ($Cr_2O_3$), molybdenum oxide ($MoO_3$), tungsten oxide ($WO_3$), aluminum oxide ($Al_2O_3$), silicon oxide ($SiO_2$), cobalt oxide (CoO), and nickel oxide (NiO).

Examples of the compound including the first metal element, carbon and nitrogen (i.e., a carbonitride) include titanium carbonitride (TiCN), zirconium carbonitride (ZrCN), hafnium carbonitride (HfCN), titanium niobium carbonitride (TiNbCN), titanium zirconium carbonitride (TiZrCN), titanium tantalum carbonitride (TiTaCN), titanium hafnium carbonitride (TiHfCN), and titanium chromium carbonitride (TiCrCN).

Examples of the compound including the first metal element, oxygen, and nitrogen (i.e., an oxynitride) include titanium oxynitride (TiON), zirconium oxynitride (ZrON), hafnium oxynitride (HfON), vanadium oxynitride (VON), niobium oxynitride (NbON), tantalum oxynitride (TaON), chromium oxynitride (CrON), molybdenum oxynitride (MoON), tungsten oxynitride (WON), aluminum oxynitride (AlON), and silicon oxynitride (SiAlON).

The solid solution derived from the binder phase compound as above means a state in which two or more types of these compounds are dissolved in each other's crystal structure, and means an interstitial solid solution, a substitutional solid solution or the like.

The binder phase compound may be one type of compound or two or more types of compounds in combination.

A total content of the binder phase compound and the solid solution derived therefrom in the binder phase preferably has a lower limit of 50% by volume, more preferably 60% by volume, still more preferably 70% by volume. The total content of the binder phase compound and the solid solution derived therefrom in the binder phase preferably has an upper limit of 80% by volume, more preferably 90% by volume, most preferably 100% by volume. The total content of the binder phase compound and the solid solution derived therefrom in the binder phase is preferably 50% by volume or more and 80% by volume or less, more preferably 60% by volume or more and 90% by volume or less, still more preferably 70% by volume or more and 100% by volume or less.

The total content of the binder phase compound and the solid solution derived therefrom in the binder phase is measured in the RIR (Reference Intensity Ratio) method through XRD.

The binder phase may include a component other than the binder phase compound. Examples of an element constituting the other component can include manganese (Mn) and rhenium (Re).

The composition of the binder phase included in the cBN sintered material can be determined through XRD (X-ray diffraction).

<Applications>

The presently disclosed cubic boron nitride sintered material is suitably applied to cutting tools, wear resistant tools, grinding tools, and the like.

The cutting, wear resistant and grinding tools using the presently disclosed cubic boron nitride sintered material may entirely be composed of the cubic boron nitride sintered material or may only have a portion (e.g., a cutting edge for a cutting tool) composed of the cubic boron nitride sintered material. Furthermore, a coating film may be formed on a surface of each tool.

The cutting tool can include drills, end mills, indexable cutting inserts for drills, indexable cutting inserts for end mills, indexable cutting inserts for milling, indexable cutting inserts for turning, metal saws, gear cutting tools, reamers, taps, cutting bites and the like.

The wear resistant tool can include dies, scribers, scribing wheels, and dressers, and the like. The grinding tool can include grinding stone and the like.

《Method for Manufacturing Cubic Boron Nitride Sintered Material》

The presently disclosed cubic boron nitride sintered material can be manufactured for example in the following method:

Initially, cubic boron nitride powder (hereinafter also referred to as cBN powder) and raw material powder for a binder are prepared.

(Preparing cBN Powder)

The cBN powder is a raw material powder for cBN grains included in the cBN sintered material. The cBN powder is not particularly limited, and can be a known cBN powder. Inter alia, the cBN powder is preferably obtained by holding hexagonal boron nitride powder in the presence of catalytic $LiCaBN_2$ in a range in which cubic boron nitride is thermodynamically stable, and thus converting the hexagonal boron nitride powder into cubic boron nitride powder.

The cBN powder's $D_{50}$ (or average grain size) is not particularly limited, and can for example be 0.1 to 12.0 μm.

The cBN powder's dislocation density can be increased for example in the following methods (a) to (c):

(a) As has been described above, when hexagonal boron nitride powder is converted to cubic boron nitride powder in the presence of a catalyst, the synthesis time is shortened. As a result, the resultant cBN powder has a particle diameter equivalent to that of the cBN powder obtained in the above method, and also has an increased dislocation density.

(b) The cBN powder obtained above is wet-milled in a ball mill (a cemented carbide container and a cemented carbide ball) to obtain cBN powder having a desired average particle diameter. The cBN powder's $D_{50}$ (or average particle diameter) is not particularly limited and can for example be 0.1 to 12.0 μm.

The cBN powder is introduced into a capsule of Ta (tantalum) and pressurized. More specifically, the cBN powder is pressurized at room temperature and at a pressure of 3 GPa or more and 10 GPa or less for 5 minutes or more and 60 minutes or less. This increases cBN's dislocation density.

(c) The cBN powder obtained above is milled by a high energy type ball mill equipped with an agitator arm (e.g., Attritor® manufactured by NIPPON COKE & ENGINEERING CO., LTD.). This increases the cBN powder's dislocation density.

Further, when sintering a powdery mixture of the cBN powder and the raw material powder for the binder, as will be described below, applying a slower rate to increase pressure also allows the sintered material to have an increased dislocation density.

(Preparing Raw Material Powder for Binder)

Raw material powder for a binder is raw material powder for the binder phase included in the cBN sintered material. The raw material powder for the binder can be prepared, for example, as follows: A compound including WC, Co, and Al is obtained by mixing 76% by weight of a nitride of Ti and 18% by weight of Al and heat-treating the mixture in a vacuum at 1200° C. for 30 minutes. The compound is pulverized to prepare the raw material powder for the binder.

While each powder is agitated and pulverized in any method, agitation and pulverization using a medium such as a ball, jet mill agitation and pulverization, and the like are preferable from the viewpoint of efficient and homogeneous agitation. Each powder may be agitated and pulverized in a wet manner or a dry manner. In the raw material powder for the binder, peaks of TiN, $Ti_2AlN$, $TiAl_3$ and the like are observed through XRD.

(Preparing Powdery Mixture)

The cBN powder and raw material powder for the binder prepared as described above are mixed together by wet ball mill-mixing using ethanol, acetone or the like as a solvent to prepare a powdery mixture. The solvent is removed by air-drying after the mixing. Subsequently, a heat treatment is performed to volatilize impurities such as moisture adsorbed on the surface of the powdery mixture and thus clean the surface of the powdery mixture.

The raw material powder for the binder can include, other than WC, Co and Al, at least one metal selected from Ni, Si, Cr, Ti, V, Zr, Nb, Mo, Hf, Ta and W, an alloy thereof, and a carbide, an oxide, a nitride, and a carbonitride thereof.

(Sintering Step)

The above powdery mixture is brought into contact with a WC-6% Co cemented carbide disc and a Co (cobalt) foil and thus introduced into a container made of Ta (tantalum), and the container is vacuumed and sealed. The powdery mixture in the vacuumed and sealed container is sintered using a belt-type ultrahigh-pressure and ultrahigh-temperature generator at 3 to 9 GPa and 1100 to 1900° C. for 5 to 30 minutes. The presently disclosed cubic boron nitride sintered material is thus manufactured.

EXAMPLES

The present embodiment will be described more specifically with reference to examples. Note, however, the present embodiment is not limited to these examples.

(Sample 1)

Initially, cubic boron nitride powder was prepared through the following procedure:

100 parts by mass of hexagonal boron nitride powder were blended with 10 parts by mass of $LiCaBN_2$ serving as a catalyst, and the mixture was held at 5 GPa and 1450° C. for 30 minutes to synthesize cubic boron nitride powder (cBN powder). The obtained cBN powder was wet-pulverized with a ball mill (a stainless steel container and a stainless steel ball) for 90 hours to obtain cBN powder having an average particle diameter (a median diameter d50 in equivalent circular diameter) of 3 μm.

The cBN powder was introduced into a capsule of Ta (tantalum) and pressurized at room temperature and 7 GPa for 60 minutes (a pressurizing step).

Subsequently, a raw material powder for a binder was prepared through the following procedure.

TiN powder and Al powder were mixed at a ratio in mass of 85:15, heat-treated in a vacuum at 1200° C. for 30 minutes, and thereafter agitated and pulverized in a wet ball mill to obtain a raw material powder for a binder.

The pressurized cBN powder and the raw material powder for the binder were mixed and uniformly agitated in a wet ball mill method using ethanol to obtain a powdery mixture. Subsequently, the powdery mixture was degassed in a vacuum at 900° C. to remove impurities such as moisture on the surface thereof. Note that in preparing the powdery mixture, the cBN powder and the raw material powder for the binder were mixed together at a ratio allowing the cubic boron nitride sintered material to include cBN grains at a ratio of 70% by volume as measured through an image analysis.

Subsequently, the powdery mixture was brought into contact with a WC-6% Co cemented carbide disc and a Co (cobalt) foil and thus introduced into a container made of Ta (tantalum), and the container was vacuumed and sealed. The powdery mixture in the vacuumed and sealed container was sintered using a belt-type ultrahigh-pressure and ultrahigh-temperature generator to increase pressure to 7 GPa at a rate of 0.4 GPa/min, and held at 7 GPa and 1700° C. for 20 minutes and thus sintered to provide a cBN sintered material for sample 1.

(Samples 2 to 6, and 35)

A cBN sintered material was produced in the same manner as in Sample 1 except that the cBN powder was pressurized under conditions changed as indicated in table 1 and table 3 at the "pressurization step" column at the "pressure (GPa)" and "(time)" subcolumns.

(Samples 7 to 12)

A cBN sintered material was produced in the same manner as in Sample 6 except that in synthesizing the cBN powder, a holding time at 5 GPa and 1450° C. was changed to those indicated in table 1 at the "synthesis of cBN powder" column at the "catalyst & holding time" subcolumn.

(Sample 13)

A cBN sintered material was produced in the same manner as in Sample 5 except that the raw material powder for the binder was changed. The raw material powder for the binder was prepared through the following procedure.

ZrN powder and Al powder were mixed at a ratio in mass of 85:15, heat-treated in a vacuum at 1200° C. for 30 minutes, and thereafter agitated and pulverized in a wet ball mill to obtain a raw material powder for a binder.

(Sample 14)

A cBN sintered material was produced in the same manner as in Sample 5 except that the raw material powder for the binder was changed. The raw material powder for the binder was prepared through the following procedure.

HfN powder and Al powder were mixed at a ratio in mass of 85:15, heat-treated in a vacuum at 1200° C. for 30 minutes, and thereafter agitated and pulverized in a wet ball mill to obtain a raw material powder for a binder.

(Sample 15)

A cBN sintered material was produced in the same manner as in Sample 5 except that the raw material powder for the binder was changed. The raw material powder for the binder was prepared through the following procedure.

VN powder and Al powder were mixed at a ratio in mass of 85:15, heat-treated in a vacuum at 1200° C. for 30 minutes, and thereafter agitated and pulverized in a wet ball mill to obtain a raw material powder for a binder.

(Sample 16)

A cBN sintered material was produced in the same manner as in Sample 5 except that the raw material powder for the binder was changed. The raw material powder for the binder was prepared through the following procedure.

NbN powder and Al powder were mixed at a ratio in mass of 85:15, heat-treated in a vacuum at 1200° C. for 30 minutes, and thereafter agitated and pulverized in a wet ball mill to obtain a raw material powder for a binder.

(Sample 17)

A cBN sintered material was produced in the same manner as in Sample 5 except that the raw material powder for the binder was changed. The raw material powder for the binder was prepared through the following procedure.

TaN powder and Al powder were mixed at a ratio in mass of 85:15, heat-treated in a vacuum at 1200° C. for 30 minutes, and thereafter agitated and pulverized in a wet ball mill to obtain a raw material powder for a binder.

(Sample 18)

A cBN sintered material was produced in the same manner as in Sample 5 except that the raw material powder for the binder was changed. The raw material powder for the binder was prepared through the following procedure.

$Cr_2N$ powder and Al powder were mixed at a ratio in mass of 85:15, heat-treated in a vacuum at 1200° C. for 30 minutes, and thereafter agitated and pulverized in a wet ball mill to obtain a raw material powder for a binder.

(Sample 19)

A cBN sintered material was produced in the same manner as in Sample 5 except that the raw material powder for the binder was changed. The raw material powder for the binder was prepared through the following procedure.

$Mo_2N$ powder and Al powder were mixed at a ratio in mass of 85:15, heat-treated in a vacuum at 1200° C. for 30 minutes, and thereafter agitated and pulverized in a wet ball mill to obtain a raw material powder for a binder.

(Sample 20)

A cBN sintered material was produced in the same manner as in Sample 5 except that the raw material powder for the binder was changed. The raw material powder for the binder was prepared through the following procedure.

$W_2N$ powder and Al powder were mixed at a ratio in mass of 85:15, heat-treated in a vacuum at 1200° C. for 30 minutes, and thereafter agitated and pulverized in a wet ball mill to obtain a raw material powder for a binder.

(Sample 21)

A cBN sintered material was produced in the same manner as in Sample 5 except that the raw material powder for the binder was changed. The raw material powder for the binder was prepared through the following procedure.

TiN powder, Cr powder, Ni powder, and Co powder were mixed at a ratio in mass of 85:5:5:5, heat-treated in a vacuum at 1200° C. for 30 minutes, and thereafter agitated and pulverized in a wet ball mill to obtain a raw material powder for a binder.

(Sample 22)

A cBN sintered material was produced in the same manner as in Sample 5 except that the raw material powder for the binder was changed. The raw material powder for the binder was prepared through the following procedure.

TiN powder and Si powder were mixed at a ratio in mass of 85:15, heat-treated in a vacuum at 1200° C. for 30 minutes, and thereafter agitated and pulverized in a wet ball mill to obtain a raw material powder for a binder.

(Sample 23)

A cBN sintered material was produced in the same manner as in Sample 5 except that the raw material powder for the binder was changed. The raw material powder for the binder was prepared through the following procedure.

TiCN powder and Al powder were mixed at a ratio in mass of 85:15, heat-treated in a vacuum at 1200° C. for 30 minutes, and thereafter agitated and pulverized in a wet ball mill to obtain a raw material powder for a binder.

(Sample 24)

A cBN sintered material was produced in the same manner as in Sample 5 except that the raw material powder for the binder was changed. The raw material powder for the binder was prepared through the following procedure.

$TiO_2$ powder, $Nb_2O_5$ powder, and carbon (C) powder were mixed at a ratio in weight of 57.19:16.79:26.02 and heat-treated at 2100° C. for 60 minutes in a nitrogen atmosphere to synthesize a single-phase compound having a composition of TiNbCN. The single-phase compound was pulverized in a wet pulverization method to have a particle diameter of 0.5 μm to obtain TiNbCN powder.

TiNbCN powder and Al powder were mixed at a ratio in mass of 85:15, heat-treated in a vacuum at 1200° C. for 30 minutes, and thereafter agitated and pulverized in a wet ball mill to obtain a raw material powder for a binder.

(Sample 25)

A cBN sintered material was produced in the same manner as in Sample 5 except that the raw material powder for the binder was changed. The raw material powder for the binder was prepared through the following procedure.

$TiO_2$ powder, $ZrO_2$ powder, and carbon (C) powder were mixed at a ratio in weight of 58.35:15.88:25.77 and heat-treated at 2100° C. for 60 minutes in a nitrogen atmosphere to synthesize a single-phase compound having a composition of TiZrCN. The single-phase compound was pulverized in a wet pulverization method to have a particle diameter of 0.5 m to obtain TiZrCN powder.

TiZrCN powder and Al powder were mixed at a ratio in mass of 85:15, heat-treated in a vacuum at 1200° C. for 30 minutes, and thereafter agitated and pulverized in a wet ball mill to obtain a raw material powder for a binder.

(Sample 26)

A cBN sintered material was produced in the same manner as in Sample 5 except that the raw material powder for the binder was changed. The raw material powder for the binder was prepared through the following procedure.

$TiO_2$ powder, $HfO_2$ powder, and carbon (C) powder were mixed at a ratio in weight of 52.45:24.38:23.17 and heat-treated at 2100° C. for 60 minutes in a nitrogen atmosphere to synthesize a single-phase compound having a composition of TiHfCN. The single-phase compound was pulverized in a wet pulverization method to have a particle diameter of 0.5 μm to obtain TiHfCN powder.

TiHfCN powder and Al powder were mixed at a ratio in mass of 85:15, heat-treated in a vacuum at 1200° C. for 30 minutes, and thereafter agitated and pulverized in a wet ball mill to obtain a raw material powder for a binder.

(Sample 27)

A cBN sintered material was produced in the same manner as in Sample 5 except that the raw material powder for the binder was changed. The raw material powder for the binder was prepared through the following procedure.

$TiO_2$ powder, $Ta_2O_5$ powder, and carbon (C) powder were mixed at a ratio in weight of 51.467:25.116:23.417 and heat-treated at 2100° C. for 60 minutes in a nitrogen atmosphere to synthesize a single-phase compound having a composition of TiTaCN. The single-phase compound was pulverized in a wet pulverization method to have a particle diameter of 0.5 μm to obtain TiTaCN powder.

TiTaCN powder and Al powder were mixed at a ratio in mass of 85:15, heat-treated in a vacuum at 1200° C. for 30 minutes, and thereafter agitated and pulverized in a wet ball mill to obtain a raw material powder for a binder.

(Sample 28)

A cBN sintered material was produced in the same manner as in Sample 5 except that the raw material powder for the binder was changed. The raw material powder for the binder was prepared through the following procedure.

$TiO_2$ powder, $Cr_2O_3$ powder (produced by Kojundo Chemical Lab. Co., Ltd.), and carbon (C) powder were mixed at a ratio in weight of 62.64:10.52:26.84 and heat-treated at 2100° C. for 60 minutes in a nitrogen atmosphere to synthesize a single-phase compound having a composition of TiCrCN. The single-phase compound was pulverized in a wet pulverization method to have a particle diameter of 0.5 μm to obtain TiCrCN powder.

TiCrCN powder and Al powder were mixed at a ratio in mass of 85:15, heat-treated in a vacuum at 1200° C. for 30 minutes, and thereafter agitated and pulverized in a wet ball mill to obtain a raw material powder for a binder.

(Samples 29 to 34)

A cBN sintered material was produced in the same manner as in Sample 5 except that in producing the powdery mixture the cBN powder and the raw material powder for the binder were mixed together at a ratio allowing the cubic boron nitride sintered material to include cBN grains at a ratio in volume indicated in tables 2 and 3 at the "cBN sintered material" column at the "cBN grains" subcolumn.

(Sample 36)

A cBN sintered material was produced in the same manner as in Sample 6 except that the cBN powder was not pressurized.

(Sample 37)

A cBN sintered material was produced in the same manner as in Sample 5 except that when producing the cBN powder, $LiBN_2$ was used as a catalyst, and a holding time at 5 GPa and 1450° C. was changed to a time indicated in Table 3.

(Sample 38)

A cBN sintered material was produced in the same manner as in Sample 6 except that after the cBN powder was synthesized, instead of ball-milling, an attritor (apparatus used: Attritor® model MS01SC manufactured by NIPPON COKE & ENGINEERING CO., LTD.) was used for pulverization (with cemented carbide balls) for 10 hours and the pressurizing step was not performed.

(Sample 39)

A cBN sintered material was produced in the same manner as in Sample 6 except that after the cBN powder was synthesized it was not pressurized and when sintering the powdery mixture, a rate of 0.2 GPa/min was applied to increase pressure to 7 GPa and 7 GPa and 1700° C. were held for 5 minutes to sinter the powdery mixture.

(Sample 40)

A cBN sintered material was produced in the same manner as in Sample 6 except that when synthesizing the cBN powder, a holding time at 5 GPa and 1450° C. was changed to 1 minute and the obtained cBN powder was not pulverized or pressurized.

<Evaluation>

(Composition of cBN Sintered Material)

The volumetric ratio between the cBN grains and the binder phase in the cBN sintered material was measured. How it was specifically measured will not be described as it is identical to a method described in an embodiment for implementing the present invention, as has been described above. It has been confirmed that for each sample, a ratio in volume of cBN grains to a cBN sintered material is a ratio in volume indicated in tables 1 to 3 at the "cBN sintered material" column at the "cBN grains (vol %)" subcolumn, and a ratio in volume of a binder phase to the cBN sintered material is as indicated in tables 1 to 3 at the "cBN sintered material" column at the "binder phase (vol %)" subcolumn.

(Composition of Binder Phase)

The composition of the binder phase in the cBN sintered material was determined through XRD. A result is shown in Tables 1 to 3 at the "binder phase" column at the "composition" subcolumn.

(Dislocation Density)

The dislocation density of the cBN grains in the cBN sintered material was measured. How it was specifically measured will not be described as it is identical to that described in an embodiment for implementing the present invention, as has been described above. A result is indicated in Tables 1 to 3 at the "dislocation density" column.

(Calcium Content)

The calcium content of the cBN grains in the cBN sintered material was measured through an ICP analysis. How it was specifically measured will not be described as it is identical to that described in an embodiment for implementing the present invention, as has been described above. A result is indicated in Tables 1 to 3 at the "cBN grain's Ca content" column.

(Cutting Test)

The cBN sintered material of each sample produced was used to produce a cutting tool (substrate's shape: CNGA120408, cutting-edge processing: T01215). Using this, a cutting test was performed under cutting conditions indicated below. The following cutting conditions correspond to intermittently processing hardened steel.

Cutting speed: 120 m/min
Feed rate: 0.1 mm/rev
Cutting depth: 0.2 mm
Coolant: (Dry)
Cutting method: strong intermittent cutting
Lathe: LB400 (manufactured by Okuma Corporation)
Workpiece: SCM 415, HRC 58-62, of φ of 100 mm×L of 300 mm having four longitudinal U-shaped grooves.

Evaluation Method: The cutting edge was observed every 1 km, and an amount by which the cutting edge was chipped was measured. A cut distance when the amount reached 100 μm or more was measured, and determined as a cutting tool's lifetime. A result thereof is indicated in Tables 1 to 3 at the "tool life" column.

TABLE 1

| | pressurization step | | synthesis of cBN | pulverization of cBN | sintering conditions | cBN sintered material | | | | cutting test |
|---|---|---|---|---|---|---|---|---|---|---|
| sample Nos. | pressure (GPA) | (time) | catalyst & holding time | method & processing time | pressure increasing rate & holding time | cBN grains (vol %) | binder phase composition | dislocation density ($/m^2$) | cBN grain's Ca content (mass %) | tool life (km) |
| 1 | 7 | 60 | LiCaBN$_2$, 30 min | ball mill 90 h | 0.4 GPa/min 20 min | 70 | TiN, TiB$_2$, AlN, Al$_2$O$_3$ | $1.00 \times 10^{20}$ | 0.1 | 3.5 |
| 2 | 7 | 5 | LiCaBN$_2$, 30 min | ball mill 90 h | 0.4 GPa/min 20 min | 70 | TiN, TiB$_2$, AlN, Al$_2$O$_3$ | $3.00 \times 10^{17}$ | 0.1 | 3.9 |
| 3 | 7 | 40 | LiCaBN$_2$, 30 min | ball mill 90 h | 0.4 GPa/min 20 min | 70 | TiN, TiB$_2$, AlN, Al$_2$O$_3$ | $9.50 \times 10^{19}$ | 0.1 | 4.0 |
| 4 | 7 | 10 | LiCaBN$_2$, 30 min | ball mill 90 h | 0.4 GPa/min 20 min | 70 | TiN, TiB2, AlN, Al$_2$O$_3$ | $5.00 \times 10^{17}$ | 0.1 | 4.1 |
| 5 | 7 | 20 | LiCaBN$_2$, 30 min | ball mill 90 h | 0.4 GPa/min 20 min | 70 | TiN, TiB2, AlN, Al$_2$O$_3$ | $9.00 \times 10^{19}$ | 0.1 | 4.1 |
| 6 | 7 | 15 | LiCaBN$_2$, 30 min | ball mill 90 h | 0.4 GPa/min 20 min | 70 | TiN, TiB2, AlN, Al$_2$O$_3$ | $8.00 \times 10^{17}$ | 0.1 | 4.5 |
| 7 | 7 | 15 | LiCaBN$_2$, 60 min | ball mill 90 h | 0.4 GPa/min 20 min | 70 | TiN, TiB$_2$, AlN, Al$_2$O$_3$ | $8.00 \times 10^{17}$ | 0.2 | 3.9 |
| 8 | 7 | 15 | LiCaBN$_2$, 5 min | ball mill 90 h | 0.4 GPa/min 20 min | 70 | TiN, TiB$_2$, AlN, Al$_2$O$_3$ | $8.00 \times 10^{17}$ | 0.02 | 4.1 |
| 9 | 7 | 15 | LiCaBN$_2$, 50 min | ball mill 90 h | 0.4 GPa/min 20 min | 70 | TiN, TiB$_2$, AlN, Al$_2$O$_3$ | $8.00 \times 10^{17}$ | 0.17 | 4.0 |
| 10 | 7 | 15 | LiCaBN$_2$, 10 min | ball mill 90 h | 0.4 GPa/min 20 min | 70 | TiN, TiB$_2$, AlN, Al$_2$O$_3$ | $8.00 \times 10^{17}$ | 0.05 | 4.2 |
| 11 | 7 | 15 | LiCaBN$_2$, 40 min | ball mill 90 h | 0.4 GPa/min 20 min | 70 | TiN, TiB$_2$, AlN, Al$_2$O$_3$ | $8.00 \times 10^{17}$ | 0.15 | 4.1 |
| 12 | 7 | 15 | LiCaBN$_2$, 20 min | ball mill 90 h | 0.4 GPa/min 20 min | 70 | TiN, TiB$_2$, AlN, Al$_2$O$_3$ | $8.00 \times 10^{17}$ | 0.07 | 4.3 |
| 13 | 7 | 15 | LiCaBN$_2$, 30 min | ball mill 90 h | 0.4 GPa/min 20 min | 70 | ZrN, ZrB$_2$, AlN Al$_2$O$_3$ | $8.00 \times 10^{17}$ | 0.1 | 3.5 |
| 14 | 7 | 15 | LiCaBN$_2$, 30 min | ball mill 90 h | 0.4 GPa/min 20 min | 70 | HfN, AlN, Al$_2$O$_3$ | $8.00 \times 10^{17}$ | 0.1 | 3.7 |
| 15 | 7 | 15 | LiCaBN$_2$, 30 min | ball mill 90 h | 0.4 GPa/min 20 min | 70 | VN, AlN, Al$_2$O$_3$ | $8.00 \times 10^{17}$ | 0.1 | 3.1 |
| 16 | 7 | 15 | LiCaBN$_2$, 30 min | ball mill 90 h | 0.4 GPa/min 20 min | 70 | NbN, AlN, Al$_2$O$_3$ | $8.00 \times 10^{17}$ | 0.1 | 3.2 |

TABLE 2

| | presssurization step | | synthesis of cBN | pulverization of cBN | sintering conditions | cBN sintered material | | | | cutting test |
|---|---|---|---|---|---|---|---|---|---|---|
| sample Nos. | pressure (GPA) | (time) | catalyst & holding time | method & processing time | pressure increasing rate & holding time | cBN grains (vol %) | binder phase composition | dislocation density ($/m^2$) | cBN grain's Ca content (mass %) | tool life (km) |
| 17 | 7 | 15 | LiCaBN$_2$, 30 min | ball mill 90 h | 0.4 GPa/min 20 min | 70 | TaN, AlN, Al$_2$O$_3$ | $8.00 \times 10^{17}$ | 0.1 | 3.2 |
| 18 | 7 | 15 | LiCaBN$_2$, 30 min | ball mill 90 h | 0.4 GPa/min 20 min | 70 | Cr2N, AlN, Al$_2$O$_3$ | $8.00 \times 10^{17}$ | 0.1 | 3.1 |
| 19 | 7 | 15 | LiCaBN$_2$, 30 min | ball mill 90 h | 0.4 GPa/min 20 min | 70 | Mo$_2$N, AlN, Al$_2$O$_3$ | $8.00 \times 10^{17}$ | 0.1 | 3.0 |

TABLE 2-continued

| sample Nos. | pressurization step pressure (GPA) | (time) | synthesis of cBN powder catalyst & holding time | pulverization of cBN method & processing time | sintering conditions pressure increasing rate & holding time | cBN sintered material cBN grains (vol %) | binder phase composition | dislocation density (/m$^2$) | cBN grain's Ca content (mass %) | cutting test tool life (km) |
|---|---|---|---|---|---|---|---|---|---|---|
| 20 | 7 | 15 | LiCaBN$_2$, 30 min | ball mill 90 h | 0.4 GPa/min 20 min | 70 | W$_2$N, AlN, Al$_2$O$_3$ | $8.00 \times 10^{17}$ | 0.1 | 3.1 |
| 21 | 7 | 15 | LiCaBN$_2$, 30 min | ball mill 90 h | 0.4 GPa/min 20 min | 70 | TiN, Ni, Co, Cr | $8.00 \times 10^{17}$ | 0.1 | 3.3 |
| 22 | 7 | 15 | LiCaBN$_2$, 30 min | ball mill 90 h | 0.4 GPa/min 20 min | 70 | TiN, Si$_3$N$_4$, SiO$_2$ | $8.00 \times 10^{17}$ | 0.1 | 3.3 |
| 23 | 7 | 15 | LiCaBN$_2$, 30 min | ball mill 90 h | 0.4 GPa/min 20 min | 70 | TiCN, TiB$_2$, AlN, Al$_2$O$_3$ | $8.00 \times 10^{17}$ | 0.1 | 3.5 |
| 24 | 7 | 15 | LiCaBN$_2$, 30 min | ball mill 90 h | 0.4 GPa/min 20 m in | 70 | TiNbCN, TiB$_2$, AlN, Al$_2$O$_3$ | $8.00 \times 10^{17}$ | 0.1 | 4.0 |
| 25 | 7 | 15 | LiCaBN$_2$, 30 min | ball mill 90 h | 0.4 GPa/min 20 min | 70 | TiZrCN, TiB$_2$, AlN, Al$_2$O$_3$ | $8.00 \times 10^{17}$ | 0.1 | 3.9 |
| 26 | 7 | 15 | LiCaBN$_2$, 30 min | ball mill 90 h | 0.4 GPa/min 20 min | 70 | TiHfCN, TiB$_2$, AlN, Al$_2$O$_3$ | $8.00 \times 10^{17}$ | 0.1 | 3.8 |
| 27 | 7 | 15 | LiCaBN$_2$, 30 min | ball mill 90 h | 0.4 GPa/min 20 min | 70 | TiHfCN, TiB$_2$, AlN, Al$_2$O$_3$ | $8.00 \times 10^{17}$ | 0.1 | 3.5 |
| 28 | 7 | 15 | LiCaBN$_2$, 30 min | ball mill 90 h | 0.4 GPa/min 20 min | 70 | TiCrCN, TiB$_2$, AlN, Al$_2$O$_3$ | $8.00 \times 10^{17}$ | 0.1 | 3.3 |
| 29 | 7 | 15 | LiCaBN$_2$, 30 min | ball mill 90 h | 0.4 GPa/min 20 m in | 80 | TiN, TiB$_2$, AlN, Al$_2$O$_3$ | $8.00 \times 10^{17}$ | 0.1 | 4.3 |
| 30 | 7 | 15 | LiCaBN$_2$, 30 min | ball mill 90 h | 0.4 GPa/min 20 min | 30 | TiN, TiB$_2$, AlN, Al$_2$O$_3$ | $8.00 \times 10^{17}$ | 0.1 | 3.9 |
| 31 | 7 | 15 | LiCaBN$_2$, 30 min | ball mill 90 h | 0.4 GPa/min 20 min | 40 | TiN, TiB$_2$, AlN, Al$_2$O$_3$ | $8.00 \times 10^{17}$ | 0.1 | 4.1 |
| 32 | 7 | 15 | LiCaBN$_2$, 30 min | ball mill 90 h | 0.4 GPa/min 20 min | 75 | TiN, TiB$_2$, AlN, Al$_2$O$_3$ | $8.00 \times 10^{17}$ | 0.1 | 3.9 |

TABLE 3

| sample Nos. | pressurization step pressure (GPa) | (time) | synthesis of cBN powder catalyst & holding time | pulverization of cBN method & processing time | sintering conditions pressure increasing rate & holding time | cBN sintered material cBN grains (vol %) | binder phase composition | dislocation density (/m$^2$) | cBN grain's Ca content (mass %) | cutting test tool life (km) |
|---|---|---|---|---|---|---|---|---|---|---|
| 33 | 7 | 15 | LiCaBN$_2$, 30 min | ball mill *90 h | 0.4 GPa/min 20 min | 28 | TiN, TiB$_2$, AlN, Al$_2$O$_3$ | $8.00 \times 10^{17}$ | 0.1 | 2.1 |
| 34 | 7 | 15 | LiCaBN$_2$, 30 min | ball mill 90 h | 0.4 GPa/min 20 min | 82 | TiN, TiB$_2$, AlN, Al$_2$O$_3$ | $8.00 \times 10^{17}$ | 0.1 | 2.8 |
| 35 | 10 | 30 | LiCaBN$_2$, 30 min | ball mill 90 h | 0.4 GPa/min 20 min | 70 | TiN, TiB$_2$, AlN, Al$_2$O$_3$ | $2.00 \times 10^{20}$ | 0.1 | 2.5 |
| 36 | — | — | LiCaBN$_2$, 30 min | ball mill 90 h | 0.4 GPa/min 20 min | 70 | TiN, TiB$_2$, AlN, Al$_2$O$_3$ | $2.00 \times 10^{17}$ | 0.1 | 2.8 |
| 37 | 7 | 15 | LiBN$_2$, 30 min | ball mill 90 h | 0.4 GPa/min 20 min | 70 | TiN, TiB$_2$, AlN, Al$_2$O$_3$ | $8.00 \times 10^{17}$ | <0.001 | 2.9 |
| 38 | — | — | LiCaBN$_2$, 30 min | ball mill 10 h | 0.4 GPa/min 20 min | 70 | TiN, TiB$_2$, AlN, Al$_2$O$_3$ | $7.80 \times 10^{17}$ | 0.1 | 4.3 |
| 39 | — | — | LiCaBN$_2$, 30 min | ball mill 90 h | 0.2 GPa/min 5min | 70 | TiN, TiB$_2$, AlN, Al$_2$O$_3$ | $7.90 \times 10^{17}$ | 0.1 | 4.1 |
| 40 | — | — | LiCaBN$_2$, 1 min | not pulverized | 0.4 GPa/min 20 min | 70 | TiN, TiB$_2$, AlN, Al$_2$O$_3$ | $1.0 \times 10^{18}$ | 0.1 | 4.0 |

DISCUSSION

The cBN sintered materials of Samples 1 to 32 and 37 to 40 correspond to examples.

The cBN sintered material of sample 33 includes cBN grains at a ratio in volume of less than 30% by volume and corresponds to a comparative example.

The cBN sintered material of sample 34 includes cBN grains at a ratio in volume exceeding 80% by volume and corresponds to a comparative example.

The cBN sintered material of Sample 35 includes cBN grains having a dislocation density of more than $1 \times 10^{20}/m^2$, and corresponds to a comparative example.

The cBN sintered material of Sample 36 includes cBN grains having a dislocation density of less than $3 \times 10^{17}/m^2$, and corresponds to a comparative example.

It has been confirmed that samples 1 to 32 and samples 37 to 40 corresponding to examples provide a longer tool life in intermittently processing hardened steel than samples 33 to 36 corresponding to comparative examples. This is presumably because samples 1 to 32 and 37 to 40 corresponding to examples are excellent in strength and thus provide a tool with enhanced fracture resistance.

While embodiments and examples of the present disclosure have been described as above, it is also planned from the beginning that the configurations of the above-described embodiments and examples are appropriately combined and variously modified.

The embodiments and examples disclosed herein are illustrative in all respects and should not be construed as being restrictive. The scope of the present invention is shown not by the above-described embodiments and examples but by the claims, and is intended to include all modifications within the scope and meaning equivalent to the claims.

The invention claimed is:

1. A cubic boron nitride sintered material comprising 30% by volume or more and 80% by volume or less of cubic boron nitride grains and 20% by volume or more and 70% by volume or less of a binder phase,
    the binder phase including:
        a simple substance, an alloy, an intermetallic compound consisting of one or more elements selected from the group consisting of a group 4 element, a group 5 element and a group 6 element of the periodic table, aluminum, silicon, iron, cobalt and nickel; or
        at least one selected from the group consisting of a compound consisting of at least one element selected from the group consisting of a group 4 element, a group 5 element and a group 6 element of the periodic table, aluminum, silicon, iron, cobalt and nickel and at least one element selected from the group consisting of nitrogen, carbon, boron and oxygen, and a solid solution derived from the compound,
    the cubic boron nitride grains having a dislocation density of $3\times10^{17}/m^2$ or more and $1\times10^{20}/m^2$ or less.

2. The cubic boron nitride sintered material according to claim 1, wherein the cubic boron nitride grains have a dislocation density of $5\times10^{17}/m^2$ or more and $9.5\times10^{19}/m^2$ or less.

3. The cubic boron nitride sintered material according to claim 1, wherein the cubic boron nitride grains include 0.2% by mass or less of calcium.

4. The cubic boron nitride sintered material according to claim 3, wherein the cubic boron nitride grains include 0.17% by mass or less of calcium.

5. The cubic boron nitride sintered material according to claim 4, wherein the cubic boron nitride grains include 0.15% by mass or less of calcium.

6. The cubic boron nitride sintered material according to claim 1, comprising 40% by volume or more and 75% by volume or less of the cubic boron nitride grains.

7. The cubic boron nitride sintered material according to claim 1, wherein the binder phase includes:
    at least one selected from the group consisting of: a simple substance selected from the group consisting of a group 4 element, a group 5 element and a group 6 element of the periodic table, aluminum, silicon, cobalt and nickel; an alloy thereof; and an intermetallic compound thereof; or
    at least one selected from the group consisting of: a compound consisting of at least one element selected from the group consisting of a group 4 element, a group 5 element and a group 6 element of the periodic table, aluminum, silicon, cobalt and nickel and at least one element selected from the group consisting of nitrogen, carbon, boron and oxygen; and a solid solution derived from the compound.

8. The cubic boron nitride sintered material according to claim 7, wherein the binder phase includes:
    at least one selected from the group consisting of a simple substance selected from the group consisting of a group 4 element, a group 5 element and a group 6 element of the periodic table, aluminum, silicon, cobalt and nickel, an alloy thereof, and an intermetallic compound thereof; and at least one selected from the group consisting of a compound consisting of at least one element selected from the group consisting of a group 4 element, a group 5 element and a group 6 element of the periodic table, aluminum, silicon, cobalt and nickel and at least one element selected from the group consisting of nitrogen, carbon, boron and oxygen, and a solid solution derived from the compound.

* * * * *